US011394661B2

(12) United States Patent
Cook et al.

(10) Patent No.: US 11,394,661 B2
(45) Date of Patent: Jul. 19, 2022

(54) COMPOSITIONAL REASONING TECHNIQUES FOR ROLE REACHABILITY ANALYSES IN IDENTITY SYSTEMS

(71) Applicant: Amazon Technologies, Inc., Seattle, WA (US)

(72) Inventors: John Byron Cook, Brooklyn, NY (US); Neha Rungta, San Jose, CA (US); Andrew Jude Gacek, Maple Grove, MN (US); Daniel George Peebles, Richland, WA (US); Carsten Varming, Brooklyn, NY (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/029,581

(22) Filed: Sep. 23, 2020

(65) Prior Publication Data

US 2022/0094643 A1 Mar. 24, 2022

(51) Int. Cl.
*H04L 41/5054* (2022.01)
*H04L 47/70* (2022.01)
*H04L 47/762* (2022.01)
*H04L 47/783* (2022.01)

(52) U.S. Cl.
CPC .......... *H04L 47/828* (2013.01); *H04L 47/762* (2013.01); *H04L 47/783* (2013.01)

(58) Field of Classification Search
CPC .... H04L 47/828; H04L 47/762; H04L 47/783
See application file for complete search history.

(56) References Cited

U.S. PATENT DOCUMENTS

| | | | |
|---|---|---|---|
| 9,893,967 B1* | 2/2018 | Tressler | H04L 43/08 |
| 10,354,752 B2* | 7/2019 | Higgs | G16H 10/60 |
| 10,673,862 B1 | 6/2020 | Threlkeld | |
| 10,798,084 B1* | 10/2020 | Rose | H04L 63/102 |
| 10,817,346 B1* | 10/2020 | Culp | G06F 21/53 |
| 10,944,758 B1* | 3/2021 | Nagargadde | H04L 63/20 |
| 2007/0282800 A1 | 12/2007 | England et al. | |
| 2007/0282841 A1 | 12/2007 | Sreedhar | |
| 2014/0189124 A1* | 7/2014 | Banatwala | H04L 61/1511 709/226 |

(Continued)

OTHER PUBLICATIONS

International Search Report and Written Opinion, PCT App. No. PCT/US21/49462 dated Dec. 14, 2021, 10 pages.

*Primary Examiner* — Abdelnabi O Musa
(74) *Attorney, Agent, or Firm* — Nicholson De Vos Webster & Elliott LLP

(57) ABSTRACT

Techniques are described for using compositional reasoning techniques to perform role reachability analyses relative to collections of user accounts and roles of a cloud provider network. Delegated role-based resource management generally is a method for controlling access to resources in cloud provider networks and other distributed systems. Many cloud provider networks, for example, implement identity and access management subsystems using this approach, where the concept of "roles" is used to specify which resources can be accessed by people, software, or (recursively) by other roles. An abstraction of the role reachability analysis is provided that can be used as input to a model-checking application to reason about such role reachability questions (e.g., which roles of an organization are reachable from other roles).

20 Claims, 10 Drawing Sheets

(56) References Cited

U.S. PATENT DOCUMENTS

| | | | |
|---|---|---|---|
| 2015/0019592 A1* | 1/2015 | Jin .......................... | G06F 17/10 |
| | | | 707/798 |
| 2018/0103052 A1* | 4/2018 | Choudhury ......... | H04L 63/1416 |
| 2020/0243165 A1* | 7/2020 | Katsuki ................. | G06N 7/005 |
| 2020/0336489 A1* | 10/2020 | Wuest ................ | H04L 63/0823 |

* cited by examiner

EXAMPLE ROLE AUTHORIZATION SEMANTICS 300

$\text{AUTH}_\sigma(p,a,r,c) \triangleq$ $$\begin{cases} vs \;\bar{\wedge}\; osc \;\bar{\wedge}\; (rs \;\bar{\vee}\; (ps \;\bar{\wedge}\; (rp \;\bar{\vee}\; (ap \;\bar{\wedge}\; bp \;\bar{\wedge}\; (ra \;\bar{\vee}\; sa))))) \text{, if } p_{\#} = r_{\#} \\ vs \;\bar{\wedge}\; osc \;\bar{\wedge}\; bp \;\bar{\wedge}\; ap \;\bar{\wedge}\; ps \;\bar{\wedge}\; (ra \;\bar{\vee}\; rp \;\bar{\vee}\; rs) \qquad\qquad \text{, otherwise} \end{cases}$$

where $vs \triangleq \begin{cases} \text{true, if } \sigma_{endpoint}(c(\text{aws:SourceVpce})) = \bot \\ [\![\sigma_{endpoint}(c(\text{aws:SourceVpce}))]\!](p,a,r,c), \text{ otherwise} \end{cases}$ $osc \triangleq \begin{cases} \text{true, if } \sigma_{scp}(p_{\#}) = \bot \vee \sigma_{master}(p_{\#}) \vee \sigma_{service-linked}(p_{role}) \\ [\![\sigma_{scp}(p_{\#})]\!](p,a,r,c), \text{ otherwise} \end{cases}$ $ps \triangleq \begin{cases} \text{true, if } \sigma_{session}(p) = \bot \\ [\![\sigma_{session}(p)]\!](p,a,r,c), \text{ otherwise} \end{cases}$ $ap \triangleq \begin{cases} \text{false, if } \sigma_{identity}(p_{role}) = \bot \\ [\![\sigma_{identity}(p_{role})]\!](p,a,r,c), \text{ otherwise} \end{cases}$ $bp \triangleq \begin{cases} \text{true, if } \sigma_{boundary}(p_{role}) = \bot \\ [\![\sigma_{boundary}(p_{role})]\!](p,a,r,c), \text{ otherwise} \end{cases}$ $rs \triangleq \begin{cases} \text{false, if } \sigma_{resource}(r) = \bot \\ [\![\sigma_{resource}(r)]\!](p,a,r,c), \text{ otherwise} \end{cases}$ $rp \triangleq \begin{cases} \text{false, if } \sigma_{resource}(r) = \bot \\ [\![\sigma_{resource}(r)]\!](p_{role},a,r,c), \text{ otherwise} \end{cases}$ $ra \triangleq \begin{cases} \text{false, if } \sigma_{resource}(r) = \bot \\ [\![\sigma_{resource}(r)]\!](p_{\#},a,r,c), \text{ otherwise} \end{cases}$ $sa \triangleq r_{service} \neq \text{kms} \wedge r_{service} \neq \text{iam}$

FIG. 3

ROLE REACHABILITY
PROGRAM 400

```
program U(p,s,t,E,p')
begin
    p := p
    s := σ
    t := t
    while true do
        t2 := nondet() ∪ t
        c := nondet()
        p2 := nondet()
        assume(AUTH_s(p,''sts:AssumeRole'',p2,c∪t2))
        assume(t2 ≠ ∅ ⇒ AUTH_s(p,''sts:TagSession'',p2,c∪t))
        s2 := nondet()
        assume(E(s,s2))

assert(p ≠ p')

s := s2
        p := p2
        t := t2
    done
end
```

FIG. 4

ROLE REACHABILITY
PROGRAM 500

```
program close(G,σ,t,E)
begin
    C := ∪G
    forall i,j ∈ Indicies(G) s.t. i≠j do
        forall (p,p') ∈ G_i do
            forall (q,q') ∈ G_j do
                if ∃x_1,x_2,x_3.Reachable(U(p',x_1,x_2,x_3,q)) = false then
                    if Reachable(U(p',σ,t,E,q')) = false then
                        C := C ∪ {(p,q')}
                    fi
                fi
            done
        done
    done
    return C
end
```

*FIG. 5*

COMPOSITIONAL REASONING TECHNIQUES FOR ROLE REACHABILITY ANALYSES IN IDENTITY SYSTEMS

BACKGROUND

Cloud provider networks enable users to use a variety of computing-related resources such as compute resources, storage resources, networking resources, and the like. When a user or application interacts with a cloud provider network (e.g., using an application programming interface (API) or command line interface (CLI) provided by the cloud provider network), the user or application typically is required to specify security credentials to indicate who the user or application is and whether the user or application has permission to access the requested resources. A cloud provider network in turn uses the security credentials to authenticate and authorize the user or application to perform various actions. The security credentials can include, for example, usernames and passwords, access keys, or the like.

BRIEF DESCRIPTION OF DRAWINGS

Various embodiments in accordance with the present disclosure will be described with reference to the drawings, in which:

FIG. 3 illustrates example authorization semantics for a role of an identity and access management service according to some embodiments.

FIG. 4 is a diagram illustrating an example role reachability program according to some embodiments.

FIG. 5 is a diagram illustrating a role reachability program used to perform a role reachability analysis relative to a set of roles associated with an organization or other grouping of identities in a cloud provider network according to some embodiments.

DETAILED DESCRIPTION

Figure 1:
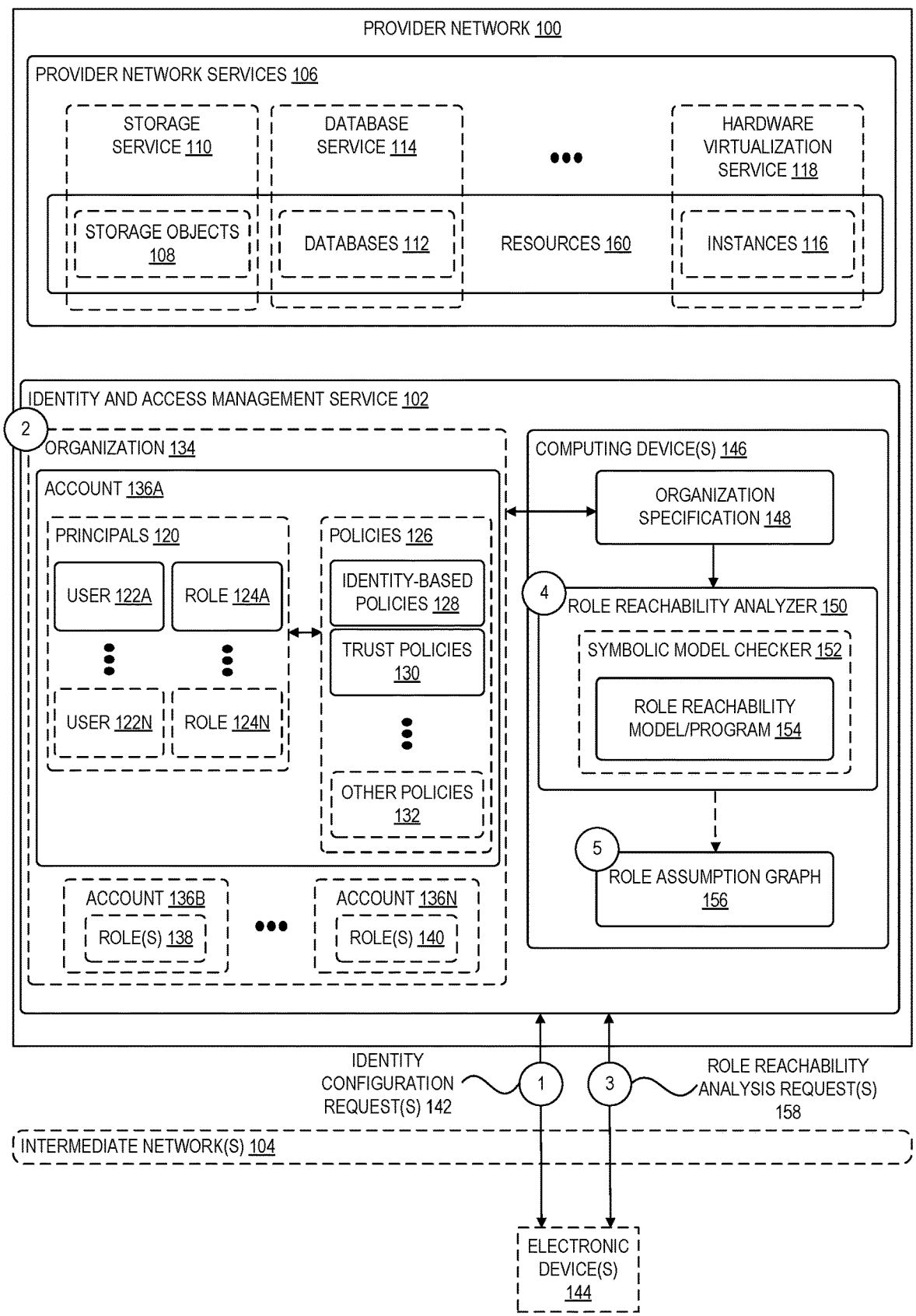
FIG. 1 is a diagram illustrating an environment in which role reachability analyses are performed relative to users' organizations (e.g., including sets of users, roles, and policies) defined by an identity and access management service of a cloud provider network according to some embodiments.

The present disclosure relates to methods, apparatus, systems, and non-transitory computer-readable storage media for using compositional reasoning techniques to perform role reachability analyses relative to collections of user accounts and roles of a cloud provider network. Delegated role-based resource management generally is a method for controlling access to resources in cloud provider networks and other distributed systems. Many cloud provider networks, for example, implement identity and access management subsystems using this approach, where the concept of "roles" is used to specify which resources can be accessed by people, software, or (recursively) by other roles. According to some embodiments, an abstraction of the role reachability analysis is provided that can be used as input to a role reachability analyzer application to reason about role reachability questions, e.g., questions related to which roles of an organization are reachable from other roles. In some embodiments, the described analysis enables an identity and access management service to programmatically reason about interactions between many possible policy types (e.g., boundary policies, service-control policies, identity policies, session policies, etc.) and further enables reasoning in the presence of other cloud provider network concepts such as transitive session tags. Furthermore, the compositionality of the analysis enables the analysis to be distributed across any number of simultaneously executing computing resources, thereby improving computational performance, memory usage, etc.

Modern cloud services providers conventionally offer integrated features for authentication and authorization to their customers. An identity and access management subsystem of a cloud provider network, for example, may provide the concepts of accounts, users (within an account), and federation (of accounts from third-party identity providers) for authentication of identities. To specify conditions under which resources can be accessed, a cloud provider network may use a general-purpose policy language together with the concepts of roles and delegated role assumption. As indicated above, delegated role-based resource management is a commonly used method for controlling access to resources in distributed computation. Role reachability is the question of which resources a role can access via a transitive closure of possibly many role assumption steps (e.g., a user A can assume a role B, and further assume a role C via the role B, etc.). Role reachability is useful to understanding the security posture of systems built to execute in the cloud, among other possible environments.

Thus, if one desires to formally prove properties about the security posture of systems that are built on top of cloud-based application programming interfaces (APIs), analysis techniques are needed that can answer role reachability questions, e.g., questions of the form: "Could the role q gain access to role r?". For example, q in account i might be able to assume into role r of account k. It could be that role r has permissions to resources for which it is undesirable for account i to have access for reasons of security, privacy, or regulatory compliance. In a cloud provider network, these resources might include storage, devices, or even write-access to the very policies that govern access to roles. Enterprise-level organizations today typically have thousands of cloud-based accounts, and tens of thousands of roles used in their cloud-based footprint. Furthermore, because many organizations are actively retiring their on-premises datacenters and adopting cloud-based IT services, the number of accounts and roles used per cloud provider network customer is growing exponentially.

In some embodiments, the analysis of role reachability can be interpreted as a model checking problem. In some embodiments, the structure of the system described herein includes an identification of a set of principals (e.g., the users and roles associated with one or more accounts of a cloud provider network), the permissions associated with the users, the trust policies associated with the roles, and the permissions associated with the roles. Embodiments described herein describe a practical solution to the role reachability problem based on such a specification that takes advantage of structure commonly observed in real-world systems: the set of possible role assumption relationships within an account are typically denser than the relationships between roles in different accounts, meaning that compositional reasoning can be used for scalability during an analysis. For intra-account analyses, a course overapproximating abstraction is described that provides sufficient fidelity for the desired types of analysis results. Among other benefits, the describe analysis techniques enables efficient computation of role reachability analyses, thereby also helping to improve the security posture of organizations' accounts at cloud provider networks.

FIG. 1 is a diagram illustrating an environment in which role reachability analyses are performed relative to users' organizations (e.g., including sets of users, roles, and policies) defined by an identity and access management service 102 of a cloud provider network 100 according to some embodiments. A cloud provider network 100 (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 104 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network 100 that includes "backend" services supporting and enabling the services that may be more directly offered to customers.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to AZ of the cloud provider network via a publicly accessible network (e.g., the Internet, a cellular communication network), e.g., by way of a transit center (TC). TCs are the primary backbone locations linking customers to the cloud provider network and may be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute resources (e.g., a "compute instance" such as a VM using a guest operating system (O/S) that operates using a hypervisor that may or may not further operate on top of an underlying host O/S, a container that may or may not operate in a VM, a compute instance that can execute on "bare metal" hardware without an underlying hypervisor), where one or multiple compute resources can be implemented using a single electronic device. Thus, a user may directly utilize a compute resource (e.g., provided by a hardware virtualization service) hosted by the provider network to perform a variety of computing tasks. Additionally, or alternatively, a user may indirectly utilize a compute resource by submitting code to be executed by the provider network (e.g., via an on-demand code execution service), which in turn utilizes one or more compute resources to execute the code—typically without the user having any control of or knowledge of the underlying compute instance (s) involved.

In some embodiments, an identity and access management service 102 is a service that enables users to securely control access to cloud provider network resources (e.g., resources 160 associated with various provider network services 106, such as storage objects 108 associated with a storage service 110, databases 112 associated with a database service 114, compute instances 116 associated with a hardware virtualization service 118, and the like). The identity and access management service 102 is used to control who is permitted to authenticate (e.g., sign in) with the cloud provider network 100 and who is authorized (e.g., has permissions) to use resources provided by the cloud provider network. In general, a resource is a concept used to capture the domain of items that can be created, read, modified, or deleted by customers in a cloud provider network 100. Examples of resources also include principals (e.g., principals 120, including example users 122A-122N and roles 124A-124N) and policies 126 (e.g., including identity-based policies 128, trust policies 130, and other policies 132). FIG. 1 further illustrates the concept of an organization 134, which can include any number of associated accounts 136A-136N, which can also include any number of users and roles (e.g., role(s) 138 associated with account 136B and role(s) 140 associated with account 136N).

In some embodiments, when a person initially creates an account with the cloud provider network 100, the person begins with a single sign-in identity that has complete access to all cloud provider network services and resources associated with the account (e.g., a root user of principals 120). For example, the root user identity may be accessed by signing in with a username (e.g., an email address) and a password used to create the account. Cloud provider networks 100 often advise users not to use a root user for most tasks and, instead, to create additional user accounts with defined permissions (e.g., including one or more of user accounts 122A-122N). In some embodiments, a user can grant different permissions to different user accounts for different resources. For example, a user account might be configured to allow some users complete access to a hardware virtualization service 118, a storage service 110, and other cloud provider network 100 resources. For other users, a user account might allow read-only access to some storage buckets, or permission to administer some instances 116, etc.

In some embodiments, an account includes identity-related objects stored as part of the identity and access management service 102 including, for example, users 122A-122N, groups (not illustrated), roles 124A-124N, policies 126, and the like. These resources can be added, edited, and removed by users of the cloud provider network 100 with sufficient privileges, e.g., using a web-based console, API, CLI, or other interface provided by the identity and access management service 102.

In some embodiments, a principal 120 represents a person or application that can make a request for an action or operation on a resource of the cloud provider network 100 (e.g., a resource 160 or a resource of the identity and access management service 102). The set of principals 120 associated with an account 136A can include any number of users 122A-122N and roles 124A-124N. A cloud provider network request occurs when a principal (e.g., a user or a role) sends a request for an action or operation on a resource. A request can include some or all of the following information: the action or operations that the principal wants to perform, the resource object upon which the actions or operations are performed, the person or application that used an entity (e.g., a user or role) to send the request, environment data (e.g., information about the IP address, user agent, SSL enabled status, time of day, etc.), and resource data (e.g., data related to the resource that is being requested, such as a resource identifier, or a tag name). In some embodiments, the identity and access management service 102 gathers the information contained in a request into a request context, which is used to evaluate and authorize the request.

In some embodiments, for a request to be completed, the identity and access management service 102 determines whether the requesting principal is authorized (e.g., permitted) to complete the request. During authorization, the identity and access management service 102 uses values included in the request context to check for policies that apply to the request (e.g., one or more of policies 126). The identity and access management service 102 uses the policies 126 to determine whether to allow or deny the request. In some embodiments, the policies are stored in the identity and access management service 102 as JavaScript Object Notation (JSON) documents (or using any other data format) and specify the permissions for principal entities. In some embodiments, there are several types of policies 126 that can affect whether a request is authorized including, e.g., identity-based policies 128, trust policies 130, among other policies 132. For example, to provide users with permissions to access resources in their own account, identity-based policies can be configured, while resource-based policies may be used for granting cross-account access to resources. In some embodiments, the identity and access management service 102 checks each policy that applies to the context of a request. If a single permissions policy includes a denied action, the identity and access management service 102 denies the entire request. In some embodiments, an identity and access management service 102 denies requests by default, such that a request is authorized only if every part of a request is allowed by applicable permissions policies.

In some embodiments, once a request is authenticated and authorized, the identity and access management service 102 approves the actions or operations in the request. Operations are defined by a service and include actions that can be performed on or relative to a resource, such as viewing, creating, editing, and deleting that resource. For example, the identity and access management service 102 may support actions such as CreateUser, DeleteUser, CreateRole, and AssumeRole, among many other possible actions. To allow a principal to perform an operation, the action is included in a policy that applies to the principal or the affected resource.

In some embodiments, identity-based policies 128 are permissions policies that are attached to an identity, such as a user, group, or role in an account. In some embodiments, resource-based policies are permissions policies that are attached to a resource such as a storage object 108 or a role trust policy. A resource-based policy controls what actions a specified principal can perform on that resource and under what conditions. In some embodiments, for example, the identity and access management service 102 supports trust policies 130, which can be attached to a role (e.g., one or more of roles 124A-124N). Because a role is both an identity and a resource that supports resource-based policies, in some embodiments, both a trust policy and an identity-based policy is attached to a role. Trust policies 130 define which principal entities (accounts, users, roles, and federated users) can assume the role.

In some embodiments, a role is an identity that a user creates in an account that has specific permissions. A role is similar to a user, in that it is an identity with permission policies that determine what the identity can and cannot do. However, instead of being uniquely associated with one person, a role is intended to be assumable by anyone who needs it. Also, a role may not have standard long-term credentials such as a password or access keys associated with it. Instead, when an entity assumes a role, it is provided with temporary security credentials for a role session. Roles can be used to delegate access to users, applications, or services that do not normally have access to the resource. For example, a person might want to grant users in an account access to resources those users do not usually have access to, or grant users in one account access to resources in another account.

In some embodiments, at circle "1" in FIG. 1, one or more users associated with an organization 134 use electronic device(s) 144 to generate identity configuration request(s) 142 to configure a set of principals 120 associated with an organization (e.g., an organization represented by organization 134) and to further configure policies 126 associated with some or all of those principals. These principals, for example, may be created to provide authentication for users and processes within accounts (e.g., account 136A-136N) of the cloud provider network 100. As indicated above, identities represent a user and can be authenticated and then authorized to perform actions in the cloud provider network 100 and each identity can be associated with one or more policies 126 to determine what actions a user or role can do with which cloud provider network resources and under what conditions. The collection of accounts, principals, and policies may be created, for example, by an organization that intends to use various services of the cloud provider network 100 for various purposes. Furthermore, the collection of accounts, principals, and policies comprising an organization may be modified over time as desired by the organization.

In some embodiments, at circle "2," responsive to the identity configuration request(s) 142, the identity and access management service 102 creates and stores data representing the accounts, principals, and policies. As further indicated above, these principals and policies can be added, edited, and removed by external users of the cloud provider network 100 with sufficient privileges, e.g., using a web-based console, API, CLI, or other interface provided by the identity and access management service 102, and data representing the principals and policies can be stored using various types of storage resources managed by the identity and access management service 102.

Figure 2:
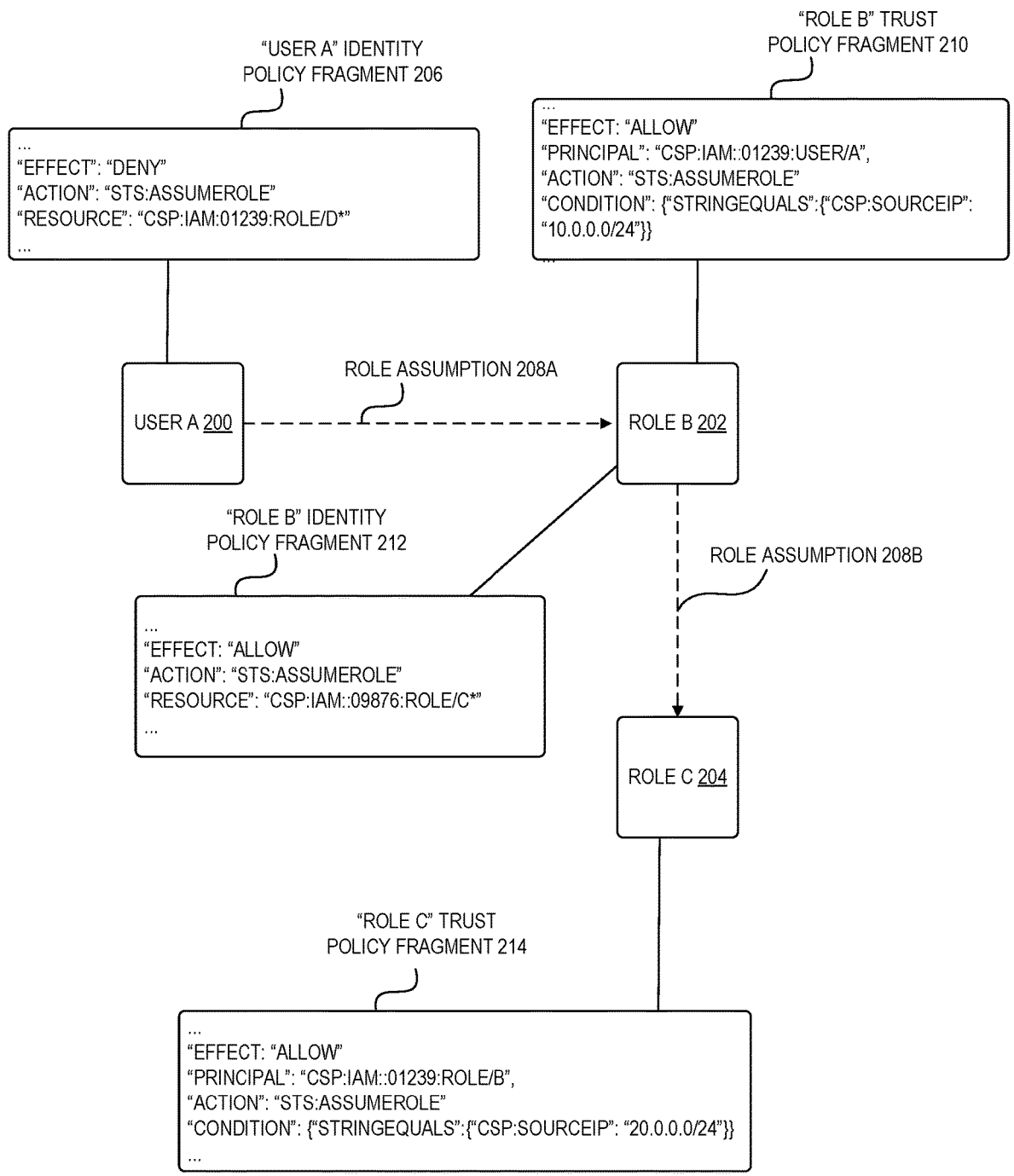
FIG. 2 is a diagram illustrating the relationship between example identity policy and trust policy fragments associated with a user and roles within a user account according to some embodiments.

FIG. 2 is a diagram illustrating the relationship between example identity policy and trust policy fragments associated with a user and roles within a user account according to some embodiments. It is noted that while typical policies defined by users of a cloud provider network 100 contain numerous conjunctions and disjunctions of "allow" and "deny" statements, the example policies in FIG. 2 represent only simple policy fragments. In an example cloud provider network 100, a principal x (e.g., a user such as user A 200, a role such as role B 202, or a role such as role C 204) can assume a role y if y's trust policy trusts x and x's identity policy grants access to the sts:AssumeRole API (e.g., an API action defined by the cloud provider network 100 and used to assume a role) for the resource y. In this example, if x and y are from different accounts, x is granted access to the sts:AssumeRole API if its identity policy explicitly grants access. If x and y are from the same account, x has access to sts:AssumeRole so long as its identity policy does not explicitly deny access.

In the example shown in FIG. 2, the user A 200 (e.g., from account 01239) is not explicitly denied access to assume role into role B 202, because role B is not in the language of "D*" used in user A's identity policy (e.g., as illustrated in the user A identity policy snippet 206). Meanwhile, role B 202 trusts user A 200 due to the policy fragment 210 (and thus the user A 200 is permitted to perform the role assumption 208A step), and role C 204 trusts role B 202 due to the policy fragment 214. The role B 202 can assume 208B into the role C (from account 09876) because C is in the language of C*. Unlike the relationship between user A 200 and role B 202, the explicit allow in C's trust policy is needed because role B 202 and role C 204 are associated with different accounts. Finally, it is noted that the conditional statements in the trust policies restrict the assume role steps to processes operating on virtual machines from restricted IP addresses such as 20.34.66.10. Thus, in this example, the user A 200 can potentially acquire the credentials for role B 202, SSH into a different cloud-based virtual machine such as 20.10.1.10, and then successfully assume the role C 204.

In some cases, the assume role chain (user A 200->role B 202->role C 204) might be behavior that is desired by users associated with the relevant organization. However, in other examples, it might be undesirable for user A 200 to be able to assume into role C 204 via role B 202. For example, if role C 204 has access to resources that the owner of the 09876 account does not desire for the user A 200 to have access to, the role assumption chain represents an undesirable possibility. Given a declarative invariant that it is desired to be proven about access in this environment, the role reachability analysis aims to find such chains of role assumption amongst the often large set of complex identity policies, resource policies, trust policies, users, roles, computational resources, etc.

In order to support a wide variety of use cases, in some embodiments, a cloud provider network 100 supports many additional concepts that could be added to the example illustrated in FIG. 2 such as, for example, session tags, transitive session tags, permissions boundaries policies, session policies, and the like. The semantics of each of these concepts interact with each other, making it increasingly difficult to answer role reachability-related questions. There is also the consideration that the policy statements being used may be modified while attempting to answer the role reachability question. The code modifying these statements may be under the control of roles considered during the analysis. The example shown in FIG. 2 elides these details in order to give a high-level example of the role reachability problem. The formal exposition described herein however is described in its entirety and the corresponding analysis supports additional such complexities.

As indicated above, a resource as used herein is a general concept used to capture the domain of items that can be created, read, modified, or deleted by customers in a cloud provider network 100. Examples include users, roles, policies, queues, databases, virtual machines, etc. In this example, $\mathcal{R}$ represents the set of valid resources, $\mathcal{P}$ represents the set of policies, and $\chi$ represents the set of principals. The syntax of $\mathcal{R}$, $\mathcal{P}$, and $\chi$ is left abstract in the semantics and it noted that $\chi \subseteq \mathcal{R}$ (e.g., a user or a role is a type of resource). In some embodiments, there is a projection on each resource, $r \in \mathcal{R}$, denoted $r_\#$, which returns the account number of the cloud provider network 100 associated with r. Several other projections are assumed, e.g., $r_{service}$=kms if the resource r is a key management service (KMS) cryptographic key. The set of actions, $\mathcal{A}$ is a set of constants such as iam:AttachRolePolicy and s3:DeleteObject. A request is thus a quadruple (p, a, r, c) such that $p \in \chi$, $a \in \mathcal{A}$, $r \in \mathcal{R}$, and c is a mapping containing additional service-specific information for the request, e.g., the aws:SourceIp key used in the policy condition example in FIG. 2, as well as session tags. It is assumed that $\mathcal{C}$ is the set of all valid mappings.

In some embodiments, policies (e.g., policies 126) are attached throughout a cloud provider network 100 to various resources, principals, and networking constructs and authorization decisions are based on the composition of these policies. The syntax of policies is left abstract, and the examples provided herein are shown in an example JSON-based syntax, although other syntaxes may be used in other examples. Assume that $q \in \mathcal{P}$ is a syntactically valid policy. In some embodiments, the q's semantics are denoted as $[\![ q ]\!]$, where $[\![ q ]\!]$, where $[\![ a ]\!]$: $\chi \times \mathcal{A} \times \mathcal{R} \times \mathcal{C} \to$ {true, false, denied}. $[\![ p ]\!]$ (p, a, r, c)=true when the request is explicitly allowed. $[\![ p ]\!]$ (p, a, r, c)=false when the request is not explicitly allowed (note that this is distinct from explicitly denied). $[\![ p ]\!]$ (p, a, r, c)=denied when the request is explicitly denied. As described in the examples hereinafter, the results of various policies are combined, using Boolean-like operations, but on the 3-valued setting: {true, false, denied}. Thus, lifted Boolean operations are defined for the 3-valued setting as follows:

$$x \overline{\wedge} y \triangleq \begin{cases} \text{denied}, & \text{if } x = \text{denied} \vee y = \text{denied} \\ x \wedge y, & \text{otherwise} \end{cases}$$

$$x \overline{\vee} y \triangleq \begin{cases} \text{denied}, & \text{if } x = \text{denied} \vee y = \text{denied} \\ x \vee y, & \text{otherwise} \end{cases}$$

In some embodiments, when used with $\overline{\vee}$ and $\overline{\wedge}$, the value denied behaves analogously to an exception in programming languages. That is, for all expressions e constructed as the combination of $\overline{\vee}$ and $\overline{\wedge}$, if denied occurs as a subexpression, then e simplifies to denied. As an example, $\forall x,y,z, x \overline{\vee} (\text{denied} \overline{\wedge} y) \overline{\vee} z = \text{denied}$.

In some embodiments, the state of the cloud provider network 100 is treated as a family of partial functions indexed by logical constants. For most constants related to the identity and management service 102, the domain of the partial function is $\mathcal{R}$, and the range is $\mathcal{P}$ when defined, and $\bot$ when undefined. That is, if $\sigma$ is a cloud provider network state and c is a valid identity and access management service-related constant, then $\sigma_c$: $\mathcal{R} \to \mathcal{P} \cup \{\bot\}$. As an example, we use the logical constant boundary to represent boundary policies. Thus, if p has a boundary policy q in the cloud provider network state $\sigma$, then $\sigma_{boundary}(p)$=q. If p has no boundary policy, then $\sigma_{boundary}(p)$=$\bot$.

In some embodiments, the example definition shown in FIG. 3 illustrates how access control decisions are made for roles, as illustrated by the role authorization semantics 300. As shown in FIG. 3, the question of whether or not role p is authorized to perform action a on the resource r is considered. For example, the identity and access management service 102 authorizes the action from a cloud provider network 100 state a if and only if AUTH$_\sigma$(p,a,r,c)=true. Here, it is assumed that p is a role; different semantics regulate authorization when p is, for example, a user. The example semantics shown in FIG. 3 are provided for illustrative purposes only; in other embodiments, the semantics of role authorization can be expressed by logic that considers other combinations of policy types and cloud provider network constructs.

In some embodiments, the equation below defines an assume role transition relation, $\leadsto$, based on the role authorization semantics defined above:

$$(p, \sigma, t) - E(p', \sigma', t') \triangleq \exists \subset AUTH_\sigma(p, sts: AssumeRole, p', e \cup t') \wedge$$
$$(t' \neq \emptyset \Rightarrow AUTH_\sigma(p, sts: TagSession, p', e \cup t')) \wedge$$
$$t \subseteq t' \wedge (\sigma, \sigma') \in E$$

Here, the equation indicates that a role p, when the cloud provider network 100 is in state $\sigma$ and the transitive session tag state is t, can assume into p' when introducing the set of new transitive session tags t'−t. The E in $\leadsto$ is used to characterize the effect of the environment on the cloud provider network states during execution. For example, while p assumes into p', the environment could add or delete roles, policies, or resources. In some embodiments, the role p' is reachable from (p, $\sigma$) under an environment model E if and only if there exists a t, t', $\sigma'$ such that $(p,\sigma,t) \leadsto_E^* (p', \sigma',t')$. In practice, the choice of E influences the question of reachability across multiple role assumption steps. For example, p' may be unreachable from p when the cloud provider network state is not changing (i.e., E={(s,s')|s=s'}), but reachable if the environment is unrestricted (e.g., E={s, s')|true}). Note that in $\leadsto$, the state of transitive session tags is explicitly tracked in $\leadsto$ in order to model their effect across possibly multiple role assumption steps.

FIG. 4 illustrates a defined program f (using assume statements, e.g., as defined by a symbolic model checker 152 or other type of role reachability analysis application) with the property that role p' is not reachable from (p, $\sigma$) under an environment model E if and only if the assert statement cannot fail in U(p, $\sigma$, t, E, p'). In some embodiments, this reduction enables the use of a software-based analysis engine (e.g., possibly including a symbolic model checker 152) to prove or disprove reachability between any two given roles p and p'. Furthermore, this analysis can be distributed across any number of concurrently executing computing devices (e.g., computing devices or resources managed by the identity and access management service 102, provided by a hardware virtualization service 118, or other service of the cloud provider network 100) enabling the analysis of an organization comprising many users and roles efficiently. For example, provided an organization including a set of roles as input, the analysis of role pairs can be distributed across any number of separate computing devices 146.

In some embodiments, at circle "3," the identity and access management service 102 receives a request 158 to perform a role reachability analysis relative to some or all of the roles associated with an account or a set of accounts (e.g., accounts associated with an organization 134). For example, the request 158 may request a role reachability analysis of a plurality of accounts of an organization (e.g., accounts 136A-136N or organization 134) associated with an identity and access management service 102 of a cloud provider network 100, where the plurality of accounts collectively includes a plurality of users 122A-122N (and users associated with accounts 136B-136N), a plurality of roles 124A-124N, 138, 140, and a plurality of policies (e.g., including policies 126). In some embodiments, the request 158 is a request to compute graphs representing possible pairs (p, p') such that p could assume into p'. In some embodiments, referring to the example program described above, and assuming a, t, and E, this can be computed as the set: $G=\{(p, p')|\text{Reachable}(U(p, a, t, E, p'))=\text{false}\}$, where Reachable represents the use of a symbolic model checker 152 or any other analysis engine. In other examples, a role reachability analysis request 158 may request the analysis of a specified set of accounts, roles, or other grouping of a set of roles to be analyzed.

In some embodiments, the request 158 specifies a selected one or more roles from an organization for analysis. For example, a user might specify one or more administrative accounts for analysis such that the role reachability analysis identifies a set of one or more other roles that can reach the administrative role(s). In other examples, a user requests an analysis of any roles associated with specified permissions (e.g., permissions to access a particular resource or to perform particular types of actions within the cloud provider network 100). These types of "inbound" analyses can, for example, assist users with identifying a set of users and roles that can reach roles with permissions to which the user may or may not desire for those users/roles to have access. In other embodiments, the request 158 specifies one or more users or roles for an "outbound" analysis of the set of roles that the users or roles can reach. For example, a user might specify a user or role that the user knows has been compromised and the analysis can provide an indication of a set of roles that the compromised user or role can reach.

In some embodiments, at circle "4," the role reachability analyzer 150 obtains organization specification 148 (e.g., data identifying information about the user account and policy information) as input and initiates execution of an analysis engine (e.g., a software-based application used to perform role reachability analyses based on the formalizations described herein, and possibly including a symbolic model checker 152) based on a role reachability model/program 154 using the organization specification 148 as input. For example, a role reachability analyzer 150 may execute on one or more computing devices 146. In some embodiments, the result of the role reachability analyzer's analysis is a role assumption graph 156, which illustrates the role reachability relationships among the roles 124A-124N identified by the role reachability analyzer 150.

In some embodiments, the role reachability analysis performed by the role reachability analyzer 150 involves identifying role reachability relationships among the plurality of roles identified in the organization specification 148 by, for each pair of roles of the plurality of roles under analysis, determining whether a set of role assumption steps exists where a second role of the pair is assumable by a first role of the pair via one or more role assumption steps. For example, for a first role A and a second role B, the analysis involves determining whether role B is reachable from role A either in view of policies permitting role A to assume directly into role B, or permitting role A to assume into role B via one or more intermediate role assumption steps (e.g., an environment exists such that role A can assume into role C, role D can be assumed from role C, and role B can be assumed from role D).

In some embodiments, the analysis described above can be further modified by noting that during the analysis, numerous reachable role chains are found and thus those role chains do not need to be recomputed. Furthermore, in typical organizations, intra-account role assumptions are relatively common, whereas inter-account role assumption is relatively rare. Thus, in some embodiments, a set of account-specific graphs can be computed as follows: $G_i=\{(p,p')|p_{\#}=i \wedge p'_{\#}=i \wedge \text{Impact}(U(p,\sigma,t,E,p'))=\text{false}\}$. Then, in some embodiments, G itself can be efficiently computed using the role reachability program 500 shown in FIG. 5. As shown, the role reachability program 500 only tries to add an edge into G if it is possible to transition across account (which is rare in a sparse environment). In some embodiments, E is synthesized using interpolation. For example, let $E=\{(s,s')|s=s'\}$, and then run $f(p,\sigma,t,E,p')$. In some embodiments, the interpolants used during the symbolic model checker proof can then be obtained and used.

Figure 6:
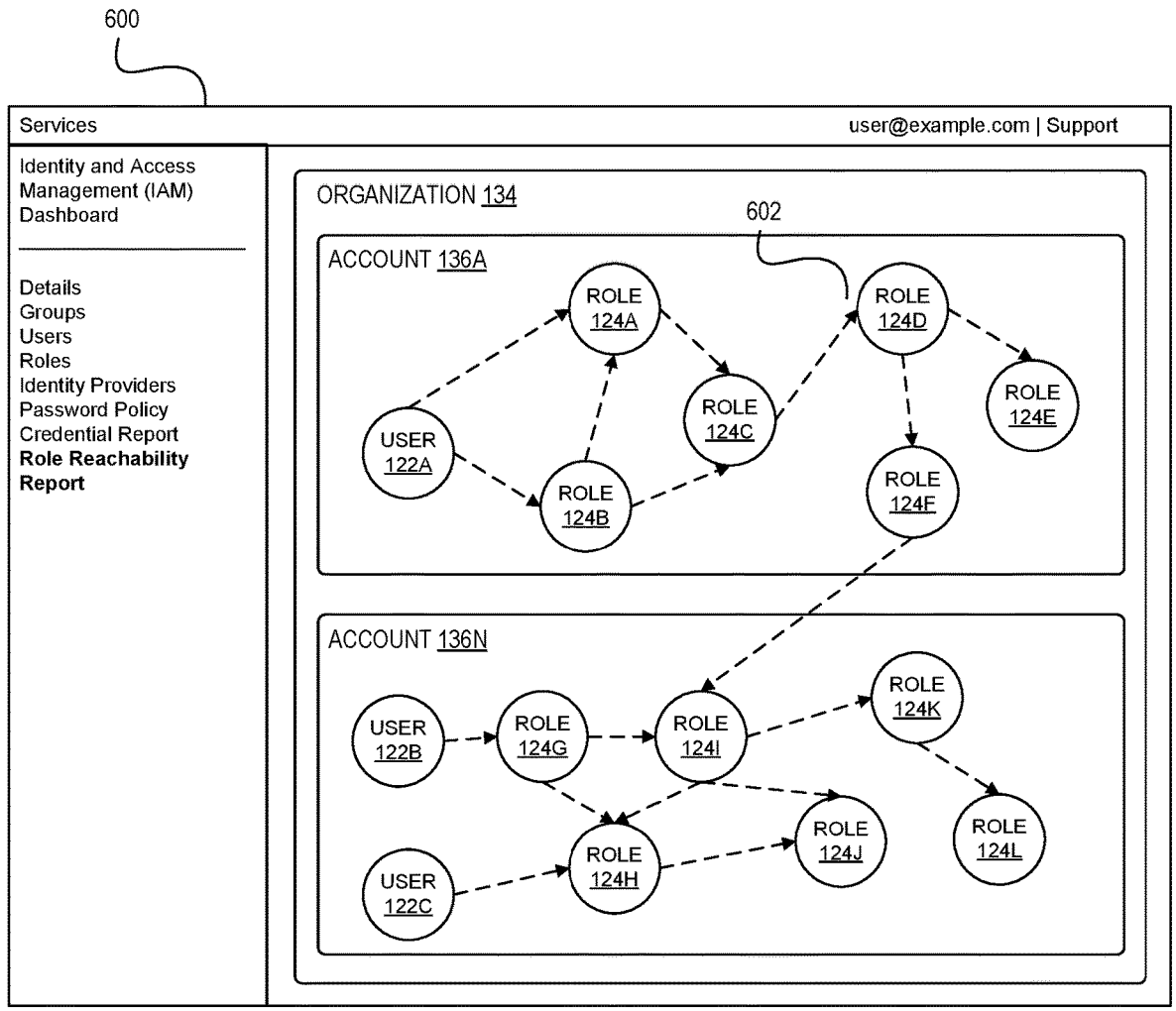
FIG. 6 is a diagram illustrating a graphical user interface (GUI) including a graph-based representation of a role reachability analysis performed relative to a collection of users, roles, and policies according to some embodiments.

In some embodiments, at circle "5," the identity and access management service 102 causes display of results of the analysis possibly including, e.g., a role reachability graph 602 in a web-based console or other GUI 600. FIG. 6 is an example of a graphical display of a role reachability graph 602 representing the role reachability relationships identified in the analysis described above relative to an identified set of roles. In some embodiments, in the role reachability graph 602, each node of the graph represents a respective role of the plurality of roles, and an edge between a first node and a second node of the graph indicates that a respective first role is permitted to assume a respective second role of the plurality of roles. For example, the role reachability graph 602 illustrates that the role 124C is reachable from user 122A via a role assumption step from user 122A to role 124A (or to role 124B) and then further from role 124A to role 124C. The example illustrated in FIG. 6 further illustrates that role assumption steps are possible across accounts, e.g., illustrated by the possible role assumption step from role 124F of account 136A to role 124I of account 136N. In other embodiments, other presentations of the role reachability analysis can be presented such as, for example, display of information associated with a particular user or role and a set of permissions and policies inherited by the user or role based on possible role assumption chains, e.g., although the presentation may or may not display a graph or other explicit representation of the role reachability chains.

In some embodiments, as indicated above, the role reachability graph 602 further provides information about the identity-policies associated with one or more of the displayed roles. For example, a user may select a role in the graph and cause the GUI to display information about the permissions granted to the role, such that a user can obtain information about the potential impact of an occurrence of the identified role assumption relationship. Although the example shown in FIG. 6 illustrates only a small number of accounts and roles, a role reachability graph 602 generally can include the display of any number of accounts, roles, users, and other information related to the role reachability analysis.

Figure 7:
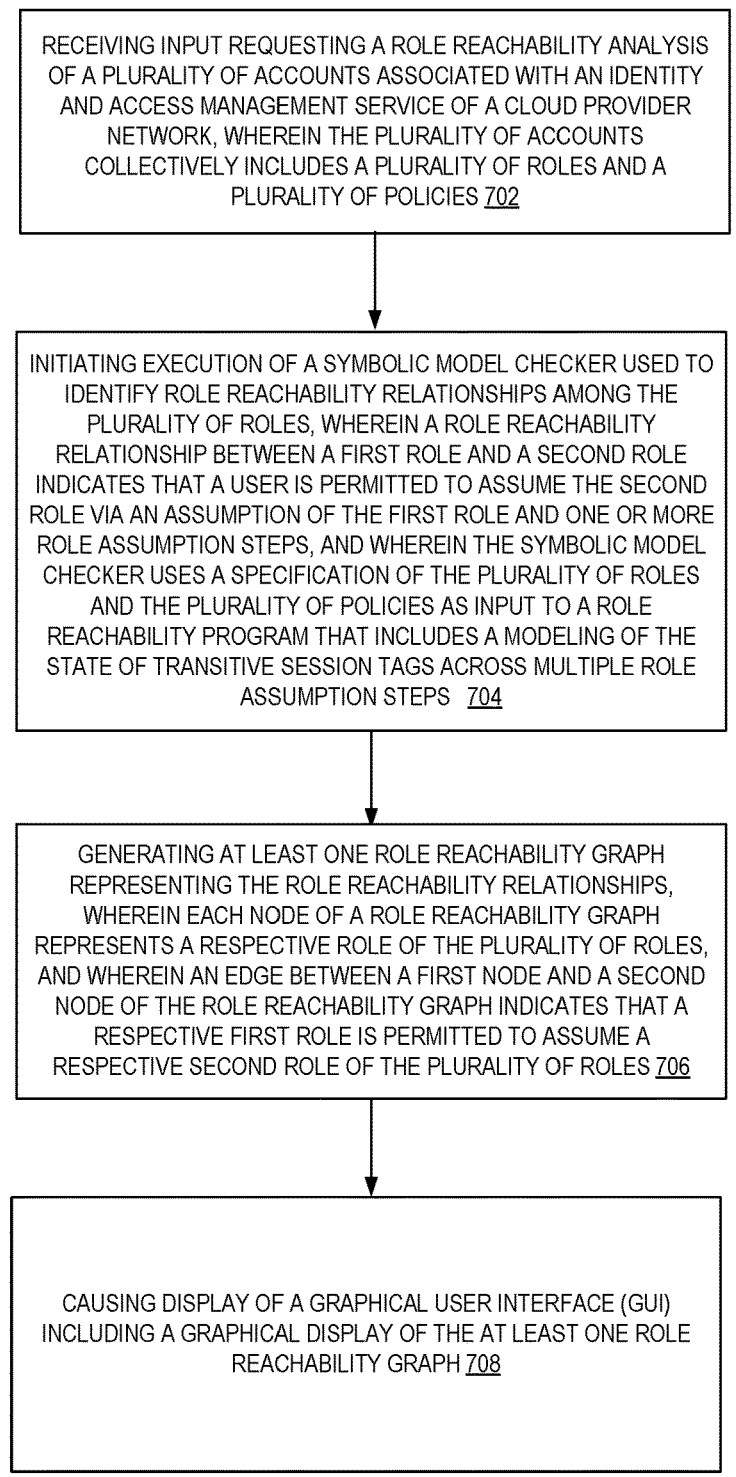
FIG. 7 is a flow diagram illustrating operations of a method for using compositional reasoning techniques for role reachability in identity systems according to some embodiments.

FIG. 7 is a flow diagram illustrating operations 700 of a method for using compositional reasoning techniques for role reachability in identity systems according to some embodiments. Some or all of the operations 700 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 700 are performed by role reachability analyzer 150 of the other figures.

The operations 700 include, at block 702, receiving input requesting a role reachability analysis of a plurality of accounts associated with an identity and access management service of a cloud provider network, wherein the plurality of accounts collectively includes a plurality of roles and a plurality of policies.

The operations 700 further include, at block 704, initiating execution of an analysis engine used to identify role reachability relationships among the plurality of roles, wherein a role reachability relationship between a first role and a second role of the plurality of roles indicates that a user is permitted to assume the second role via an assumption of the first role and one or more role assumption steps, and wherein the analysis engine uses a specification of the plurality of roles and the plurality of policies as input to a role reachability program that includes a modeling of the state of transitive session tags across multiple role assumption steps.

The operations 700 further include, at block 706, generating at least one role reachability graph representing the role reachability relationships, wherein each node of a role reachability graph represents a respective role of the plurality of roles, and wherein an edge between a first node and a second node of the role reachability graph indicates that a respective first role is permitted to assume a respective second role of the plurality of roles.

The operations 700 further include, at block 708, causing display of a graphical user interface (GUI) including a graphical display of the at least one role reachability graph.

Figure 8:
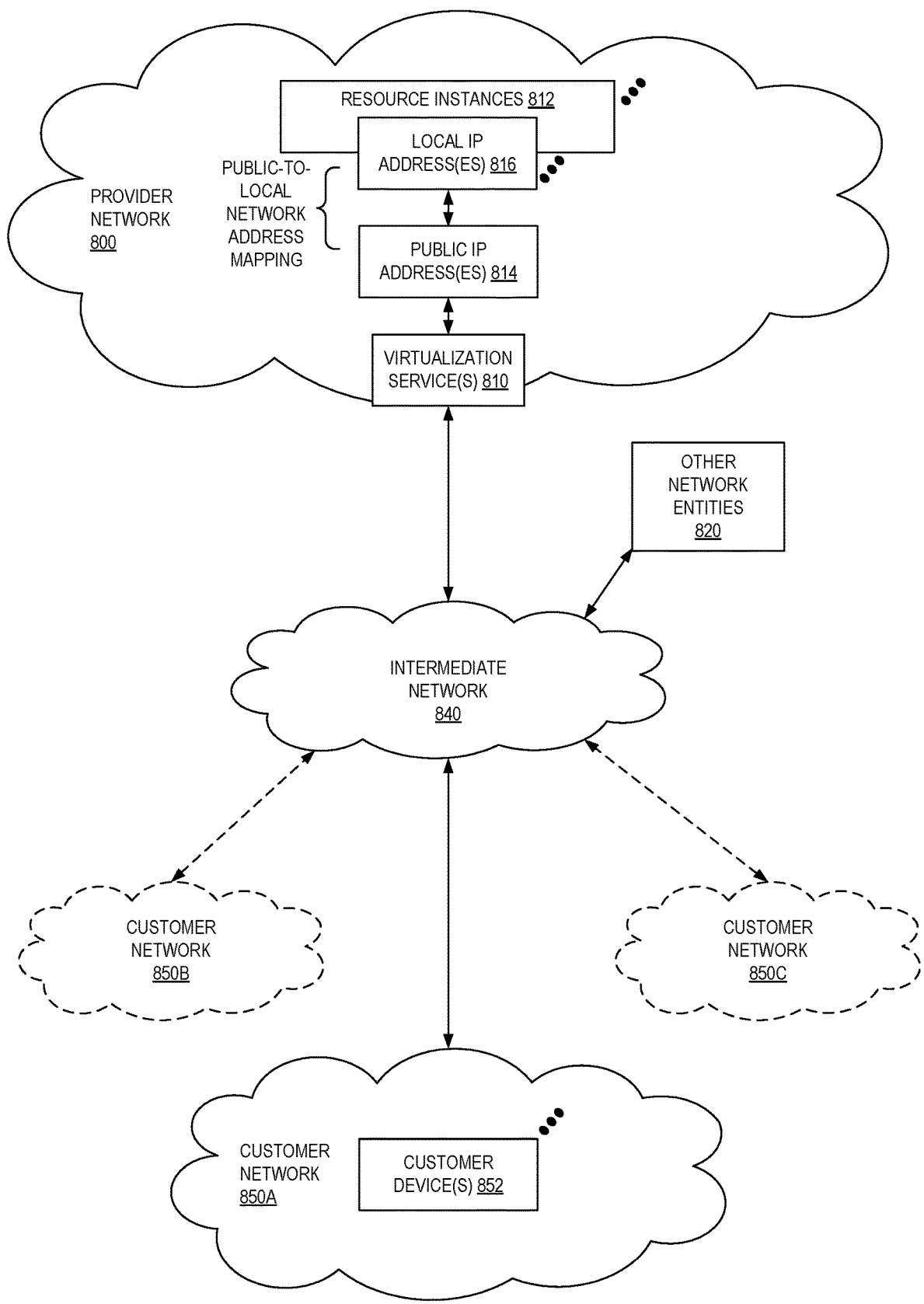
FIG. 8 illustrates an example provider network environment according to some embodiments.

FIG. 8 illustrates an example provider network (or "service provider system") environment according to some embodiments. A provider network 800 may provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 may be associated with the resource instances 812; the local IP addresses are the internal network addresses of the resource instances 812 on the provider network 800. In some embodiments, the provider network 800 may also provide public IP addresses 814 and/or public IP address ranges (e.g., Internet Protocol version 4 (IPv4) or Internet Protocol version 6 (IPv6) addresses) that customers may obtain from the provider 800.

Conventionally, the provider network 800, via the virtualization services 810, may allow a customer of the service provider (e.g., a customer that operates one or more client networks 850A-850C including one or more customer device(s) 852) to dynamically associate at least some public IP addresses 814 assigned or allocated to the customer with particular resource instances 812 assigned to the customer. The provider network 800 may also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of customer network(s) 850A-850C may, for example, implement customer-specific applications and present the customer's applications on an intermediate network 840, such as the Internet. Other network entities 820 on the intermediate network 840 may then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 may be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 800; a customer may then assign their allocated public IP addresses to particular resource instances allocated to the customer.

These public IP addresses may be referred to as customer public IP addresses, or simply customer IP addresses. Instead of being assigned by the provider network 800 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
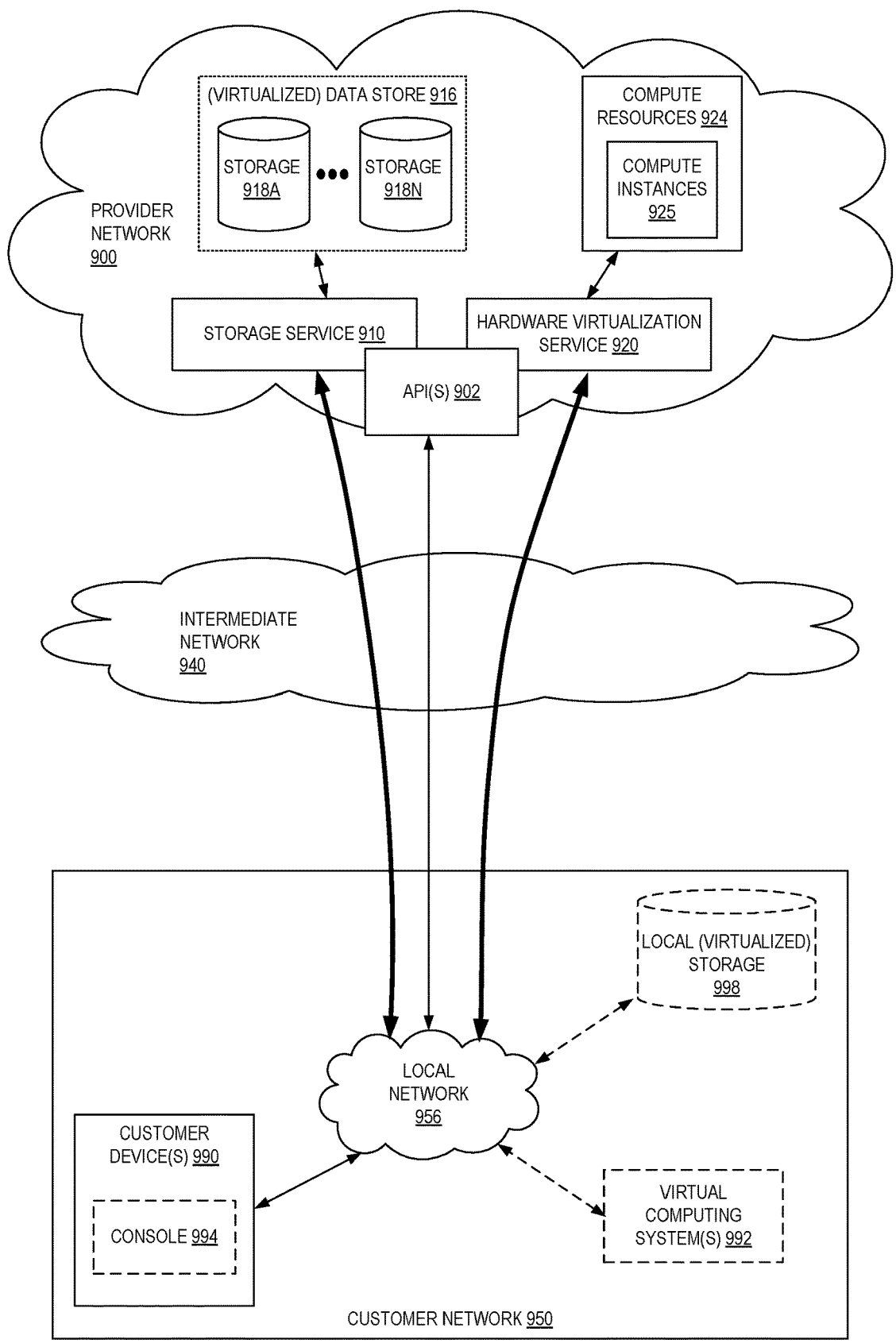
FIG. 9 is a block diagram of an example provider network that provides a storage service and a hardware virtualization service to customers according to some embodiments.

FIG. 9 is a block diagram of an example provider network that provides a storage service and a hardware virtualization service to customers, according to some embodiments. Hardware virtualization service 920 provides multiple compute resources 924 (e.g., compute instances 925 such as VMs) to customers. The compute resources 924 may, for example, be rented or leased to customers of the provider network 900 (e.g., to a customer that implements customer network 950). Each computation resource 924 may be provided with one or more local IP addresses. Provider network 900 may be configured to route packets from the local IP addresses of the compute resources 924 to public Internet destinations, and from public Internet sources to the local IP addresses of compute resources 924.

Provider network 900 may provide a customer network 950, for example coupled to intermediate network 940 via local network 956, the ability to implement virtual computing systems 992 via hardware virtualization service 920 coupled to intermediate network 940 and to provider network 900. In some embodiments, hardware virtualization service 920 may provide one or more APIs 902, for example a web services interface, via which a customer network 950 may access functionality provided by the hardware virtualization service 920, for example via a console 994 (e.g., a web-based application, standalone application, mobile application, etc.). In some embodiments, at the provider network 900, each virtual computing system 992 at customer network 950 may correspond to a computation resource 924 that is leased, rented, or otherwise provided to customer network 950.

From an instance of a virtual computing system 992 and/or another customer device 990 (e.g., via console 994), the customer may access the functionality of storage service 910, for example via one or more APIs 902, to access data from and store data to storage resources 918A-918N of a virtual data store 916 (e.g., a folder or "bucket", a virtualized volume, a database, etc.) provided by the provider network 900. In some embodiments, a virtualized data store gateway (not shown) may be provided at the customer network 950 that may locally cache at least some data, for example frequently-accessed or critical data, and that may communicate with storage service 910 via one or more communications channels to upload new or modified data from a local cache so that the primary store of data (virtualized data store 916) is maintained. In some embodiments, a user, via a virtual computing system 992 and/or on another customer device 990, may mount and access virtual data store 916 volumes via storage service 910 acting as a storage virtualization service, and these volumes may appear to the user as local (virtualized) storage 998.

While not shown in FIG. 9, the virtualization service(s) may also be accessed from resource instances within the provider network 900 via API(s) 902. For example, a customer, appliance service provider, or other entity may access a virtualization service from within a respective virtual network on the provider network 900 via an API 902 to request allocation of one or more resource instances within the virtual network or within another virtual network.

Figure 10:
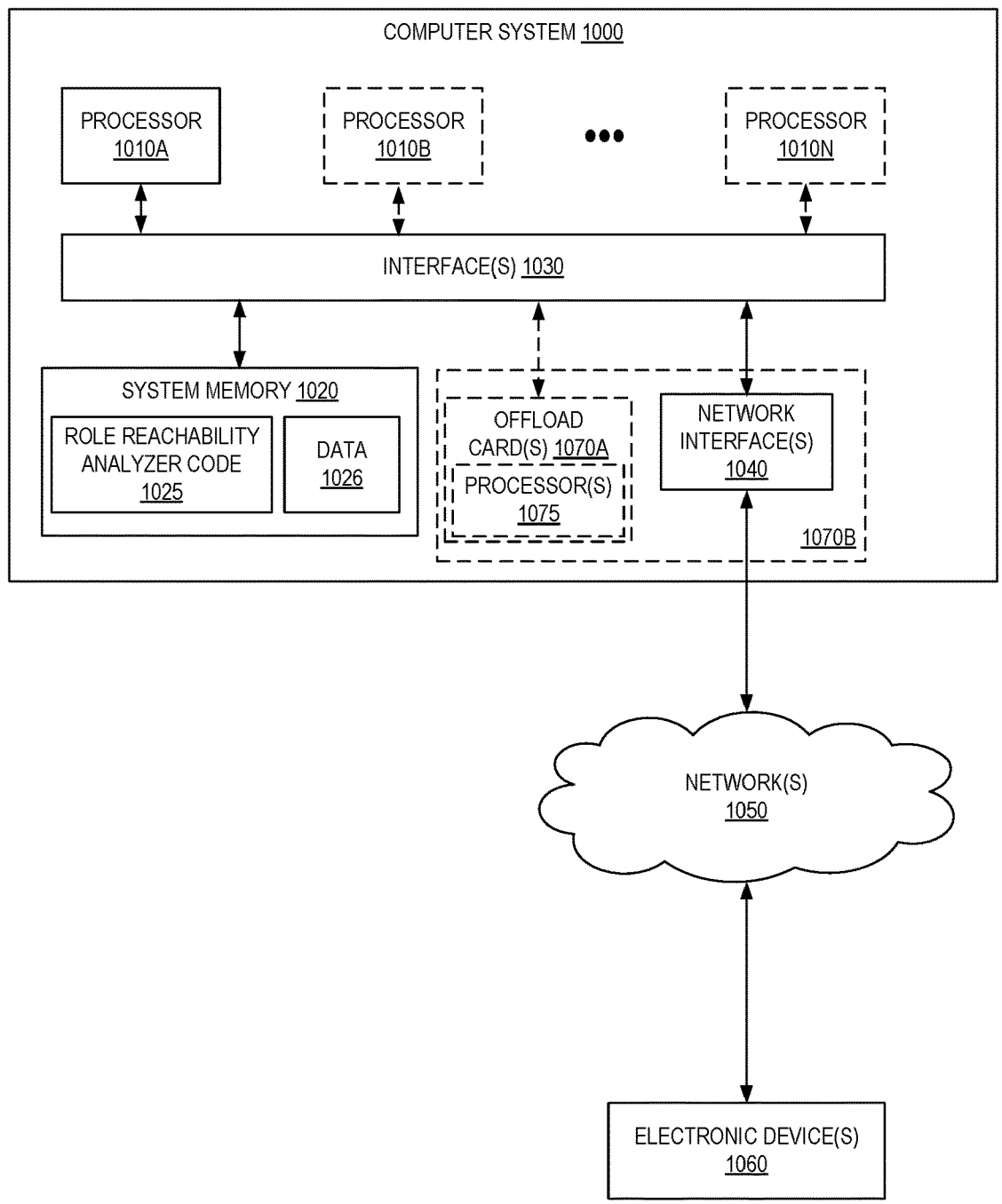
FIG. 10 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1000 illustrated in FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030. While FIG. 10 shows computer system 1000 as a single computing device, in various embodiments a computer system 1000 may include one computing device or any number of computing devices configured to work together as a single computer system 1000.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1010 may commonly, but not necessarily, implement the same ISA.

System memory 1020 may store instructions and data accessible by processor(s) 1010. In various embodiments, system memory 1020 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1020 as role reachability analyzer code 1025 (e.g., executable to implement, in whole or in part, the role reachability analyzer 150) and data 1026.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example.

Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIG. 1, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1000 includes one or more offload cards 1070A or 1070B (including one or more processors 1075, and possibly including the one or more network interfaces 1040) that are connected using an I/O interface 1030 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1000 may act as a host electronic device (e.g., operating as part of a hardware virtualization service) that hosts compute resources such as compute instances, and the one or more offload cards 1070A or 1070B execute a virtualization manager that can manage compute instances that execute on the host electronic device. As an example, in some embodiments the offload card(s) 1070A or 1070B can perform compute instance management operations such as pausing and/or un-pausing compute instances, launching and/or terminating compute instances, performing memory transfer/copying operations, etc. These management operations may, in some embodiments, be performed by the offload card(s) 1070A or 1070B in coordination with a hypervisor (e.g., upon a request from a hypervisor) that is executed by the other processors 1010A-1010N of the computer system 1000. However, in some embodiments the virtualization manager implemented by the offload card(s) 1070A or 1070B can accommodate requests from other entities (e.g., from compute instances themselves), and may not coordinate with (or service) any separate hypervisor.

In some embodiments, system memory 1020 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 918A-918N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving input requesting a role reachability analysis of a plurality of accounts associated with an identity and access management service of a cloud provider network, wherein the plurality of accounts collectively includes a plurality of roles and a plurality of policies;
   initiating execution of an analysis engine used to identify role reachability relationships among the plurality of roles, wherein a role reachability relationship between a first role and a second role of the plurality of roles indicates that a user is permitted to assume the second role via an assumption of the first role and one or more role assumption steps, and wherein the analysis engine uses a specification of the plurality of roles and the plurality of policies as input to a role reachability program that includes a modeling of the state of transitive session tags across multiple role assumption steps;
   generating at least one role reachability graph representing the role reachability relationships, wherein each node of a role reachability graph represents a respective role of the plurality of roles, and wherein an edge between a first node and a second node of the role reachability graph indicates that a respective first role is permitted to assume a respective second role of the plurality of roles; and
   causing display of a graphical user interface (GUI) including a graphical display of the at least one role reachability graph.

2. The computer-implemented method of claim 1, further comprising identifying the role reachability relationships among the plurality of roles by, for each pair of roles of the plurality of roles, determining whether a set of role assumption steps exists wherein a second role of the pair is assumable by a first role of the pair via the set of role assumption steps.

3. The computer-implemented method of claim 1, wherein execution of the analysis engine involves analyzing pairs of roles of the plurality of roles, and wherein the method further comprises distributing analysis of the pairs of roles across a plurality of concurrently executing computing resources.

4. A computer-implemented method comprising:
   obtaining data specifying a first role and a second role defined by an identity and access management service of a cloud provider network and further specifying a plurality of policies each associated with the first role or the second role;
   initiating execution of an analysis engine to determine that the second role is reachable from the first role via one or more role assumption steps, wherein the analysis engine uses the data as input to a role reachability program that includes a modeling of the state of transitive session tags across multiple role assumption steps; and
   causing display of a graphical user interface (GUI) including a representation of the first role and the second role and further including an indication of the one or more role assumption steps between the first role and second role.

5. The computer-implemented method of claim 4, wherein the first role and the second role are part of a plurality of roles analyzed by the analysis engine, and wherein the method further comprises: identifying role reachability relationships among the plurality of roles by, for each pair of roles of the plurality of roles, determining whether a set of role assumption steps exists wherein a second role of the pair is assumable by a first role of the pair via the set of role assumption steps.

6. The computer-implemented method of claim 4, wherein the first role and the second role are part of a plurality of roles analyzed by the analysis engine, wherein execution of the analysis engine involves analyzing pairs of roles of the plurality of roles, and wherein the method further comprises distributing analysis of the pairs of roles across a plurality of concurrently executing computing resources.

7. The computer-implemented method of claim 4, wherein the first role and the second role are associated with one or more accounts defined by an identity and access management service of a cloud provider network, and wherein the identity and access management service initiates the execution of the analysis engine responsive to a request to perform a role reachability analysis on the one or more accounts defined by the identity and access management service.

8. The computer-implemented method of claim 4, further comprising:
   receiving, by an identity and access management service of a cloud provider network, input requesting a role reachability analysis of a plurality of accounts of an organization defined by an identity and access management service of the cloud provider network, wherein the organization includes a plurality of roles including the first role and the second role; and
   identifying a plurality of role reachability relationships among the plurality of roles including determining that the second role is reachable from the first role.

9. The computer-implemented method of claim 4, wherein the first role is associated with a first account of a cloud provider network and the second role is associated with a second account of the cloud provider network, and wherein the GUI includes an indication that the first role and the second role are associated with different accounts.

10. The computer-implemented method of claim 4, wherein the second role is associated with a trust policy that specifies one or more principals that are permitted to assume the first role, wherein the first role is further associated with an identity policy that specifies permissions granted to the first role, and wherein the data used as input to the analysis engine further includes a representation of the trust policy and the identity policy.

11. The computer-implemented method of claim 4, wherein the role reachability program further models the use of at least one of: a permissions boundaries policy used to define maximum permissions that identity-based policies can grant to entities including the first role or second role, a session policy used to define permissions that a role grants to a session, a service control policy used to define permissions for entities of an organization including the first role or the second role, or a resource-based policy used to define permissions for a resource.

12. The computer-implemented method of claim 4, wherein the GUI includes a graphical display of a role reachability graph including a first node representing the first role, a second node representing the second role, and one or more edges representing one or more role assumption steps between the first role and the second role.

13. The computer-implemented method of claim 4, further comprising:
   receiving input selecting the second role; and
   causing display of identity-policy information associated with the second role, wherein the identity-policy information specifies permissions granted to the second role.

14. The computer-implemented method of claim 4, wherein a transitive session tag of the transitive session tags is a metadata assigned to a role assumption session, and wherein the transitive session tag is inherited by subsequent role assumption sessions associated with subsequent role assumption steps.

15. The computer-implemented method of claim 4, further comprising:
   receiving a request specifying a set of one or more roles including the first role and further specifying an inbound or outbound analysis of the reachability of the one or more roles; and
   wherein the analysis engine determines a set of inbound or outbound roles that can reach the one or more roles, and wherein the GUI further includes a representation of the inbound or outbound roles.

16. A system comprising:
   a first one or more electronic devices to implement an identity and access management service in a multi-tenant cloud provider network, the identity and access management service including instructions that upon execution cause the identity and access management service to:
      receive input requesting a role reachability analysis of a plurality of accounts associated with an identity and access management service of a cloud provider network, wherein the plurality of accounts collectively includes a plurality of roles and a plurality of policies,
      initiate execution of an analysis engine used to identify role reachability relationships among the plurality of roles, wherein a role reachability relationship between a first role and a second role of the plurality of roles indicates that a user is permitted to assume the second role via an assumption of the first role and one or more role assumption steps, and cause display of a graphical user interface (GUI) including a graphical display of at least one role reachability graph generated by the analysis engine; and a second one or more electronic devices to implement an analysis engine in the multi-tenant cloud provider network, the analysis engine including instructions that upon execution cause the analysis engine to:

use a specification of the plurality of roles and the plurality of policies as input to a role reachability program that includes a modeling of the state of transitive session tags across multiple role assumption steps, and generate at least one role reachability graph representing the role reachability relationships, wherein each node of a role reachability graph represents a respective role of the plurality of roles, and wherein an edge between a first node and a second node of the role reachability graph indicates that a respective first role is permitted to assume a respective second role of the plurality of roles.

17. The system of claim 16, wherein the analysis engine further includes instructions that upon execution cause the analysis engine to identify the role reachability relationships among the plurality of roles by, for each pair of roles of the plurality of roles, determining whether a set of role assumption steps exists wherein a second role of the pair is assumable by a first role of the pair via the set of role assumption steps, wherein the role reachability graph represents one or more transitively closed graphs representing the role reachability relationships.

18. The system of claim 16, wherein execution of the analysis engine involves analyzing pairs of roles of the plurality of roles, and wherein the identity and access management service further includes instructions that upon execution cause the identity and access management service to distribute the analysis of the pairs of roles across a plurality of concurrently executing computing resources.

19. The system of claim 16, wherein the first role is associated with a first account of a cloud provider network and the second role is associated with a second account of the cloud provider network, and wherein the GUI includes an indication that the first role and the second role are associated with different accounts.

20. The system of claim 16, wherein the second role is associated with a trust policy that specifies one or more principals that are permitted to assume the first role, wherein the first role is further associated with an identity policy that specifies permissions granted to the first role, and wherein data used as input to the analysis engine further includes a representation of the trust policy and the identity policy.

* * * * *